United States Patent [19]

DuBois

[11] E Patent Number: Re. 32,577

[45] Reissued Date of Patent: Jan. 12, 1988

[54] FLUID PUMPING DEVICE FOR USE WITH A FLUID PUMP

[75] Inventor: Chester G. DuBois, Zion, Ill.

[73] Assignee: Outboard Marine Corporation, Waukegan, Ill.

[21] Appl. No.: 869,668

[22] Filed: Jun. 2, 1986

Related U.S. Patent Documents

Reissue of:

[64] Patent No.: 4,555,221
Issued: Nov. 26, 1985
Appl. No.: 573,302
Filed: Jan. 23, 1984

U.S. Applications:

[63] Continuation-in-part of Ser. No. 540,045, Oct. 7, 1983.

[51] Int. Cl.[4] ..... F04B 43/06

[52] U.S. Cl. ..... 417/319; 123/73 AD; 123/198 C; 123/575; 417/375

[58] Field of Search ..... 123/196 R, 196 CP, 73 AD, 123/73 R, 575, 576, 577, 578; 222/382, 383, 133

[56] References Cited

U.S. PATENT DOCUMENTS

| | | | |
|---|---|---|---|
| Re. 29,193 | 4/1977 | Carlyle | 137/99 |
| 2,935,057 | 5/1960 | Perlewitz | 123/73 AD |
| 2,951,745 | 9/1960 | Sweet et al. | 23/253 |
| 2,982,447 | 5/1961 | Austin | 417/395 X |
| 3,162,132 | 12/1964 | Kling | 417/375 |
| 3,168,904 | 2/1965 | Conover | 137/558 |
| 3,481,318 | 12/1969 | Sparrow et al. | 184/29 |
| 3,653,784 | 4/1972 | Leitermann et al. | 123/73 AD |
| 3,765,802 | 10/1973 | Leitermann et al. | 417/395 |
| 4,381,741 | 5/1983 | Walsworth | 123/73 AD |
| 4,383,504 | 5/1983 | Walsworth | 123/73 AD |
| 4,403,578 | 9/1983 | Iwai et al. | 123/73 AD |
| 4,471,728 | 9/1984 | Borst et al. | 123/73 AD |
| 4,473,340 | 9/1984 | Walsworth | 417/274 |
| 4,539,949 | 9/1985 | Walsworth | 123/73 AD |
| 4,552,101 | 11/1985 | Borst et al. | 123/73 AD |
| 4,583,500 | 4/1986 | Hundertmark | 123/73 AD |
| 4,594,970 | 6/1986 | Baars et al. | 123/73 AD |
| 4,617,879 | 10/1986 | Mori | 123/73 AD |
| 4,638,771 | 1/1987 | Mori | 123/73 AD |

*Primary Examiner*—Leonard E. Smith
*Attorney, Agent, or Firm*—Michael, Best & Friedrich

[57] ABSTRACT

A fluid pumping arrangement including a fluid pump including a suction port, and a fluid pumping device comprising a pump housing defining a recess, and a moveable wall which is located in the recess and which cooperates with the recess to define a variable volume pumping chamber. The pumping device also includes a fluid inlet communicable with the fluid pumping chamber and adapted to communicate with a source of fluid, a fluid outlet communicable with the fluid pumping chamber and communicating with the suction port, and an arrangement for effecting reciprocating movement of the moveable wall in response to alternate communication of the fluid pumping chamber with the fluid outlet and with the fluid inlet.

32 Claims, 3 Drawing Figures

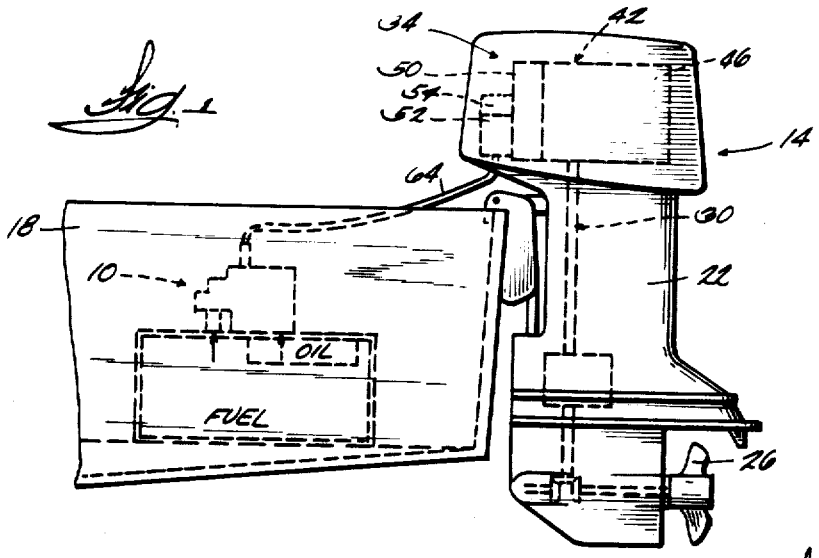
Fig. 1
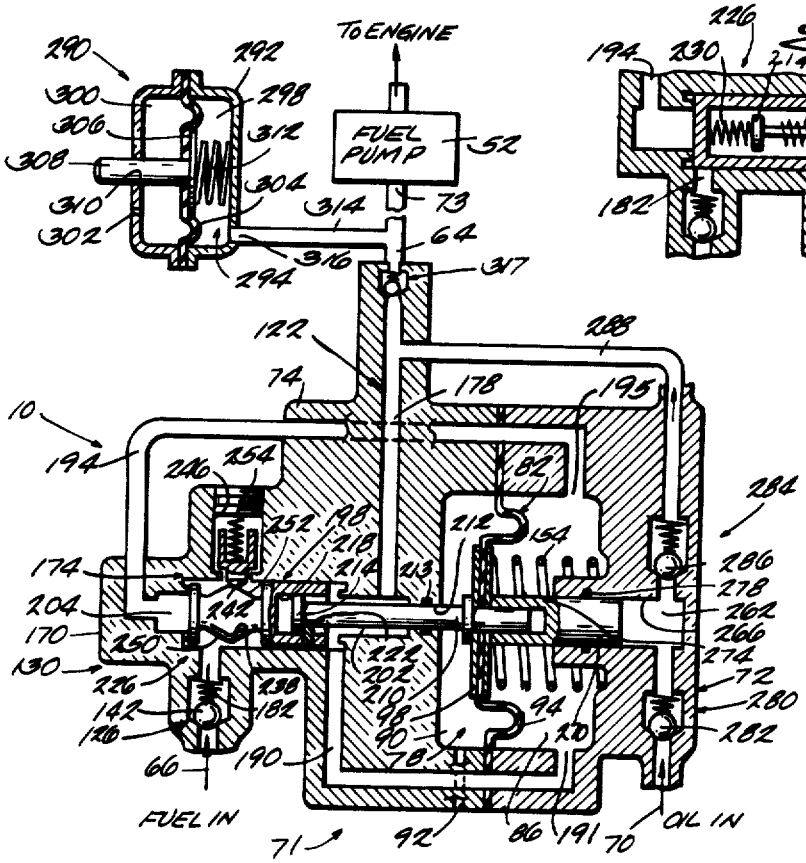
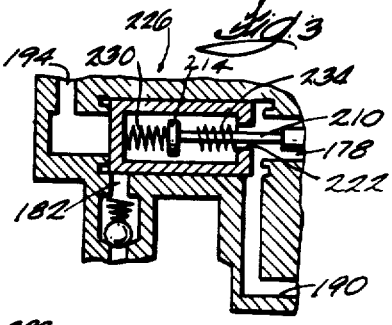
Fig. 3
Fig. 2

FLUID PUMPING DEVICE FOR USE WITH A FLUID PUMP

Matter enclosed in heavy brackets [ ] appears in the original patent but forms no part of this reissue specification; matter printed in italics indicates the additions made by reissue.

RELATED APPLICATIONS

This application is a continuation-in-part of DuBois application filed Oct. 7, 1983 as Ser. No. 540,045.

OTHER RELATED APPLICATIONS

Attention is directed to the following related U.S. applications: Walsworth application Ser. No. 314,224, filed Oct. 23, 1981; Walsworth application Ser. No. 324,145, filed Nov. 23, 1981; Walsworth application Ser. No. 309,558, filed Oct. 8, 1981; Walsworth application Ser. No. 410,497, filed Aug. 23, 1982; Borst et al application Ser. No. 464,197, filed Feb. 7, 1983; and Borst et al application Ser. No. 492,557, filed May 9, 1983.

BACKGROUND OF THE INVENTION

This invention relates to fluid pumping devices adapted to be driven by a fluid pump, and, more particularly, to fluid pumping arrangements for marine propulsion devices.

Attention is directed to the pumps disclosed in Leitermann, et al. U.S. Pat. No. 3,765,802, issued Oct. 16, 1973, and Sweet et al. U.S. Pat. No. 2,951,745, issued Sept. 6, 1960.

SUMMARY OF THE INVENTION

This invention provides a fluid pumping arrangement including a fluid pump including a suction port, and a fluid pumping device comprising a pump housing defining a recess, and a moveable wall which is located in the recess and which cooperates with the recess to define a variable volume pumping chamber. The pumping device also includes a fluid inlet communicable with the fluid pumping chamber and adapted to communicate with a source of fluid, a fluid outlet communicable with the fluid pumping chamber and communicating with the suction port, and means for effecting reciprocating movement of the moveable wall in response to alternate communication of the fluid pumping chamber wih the fluid outlet and with the fluid inlet, whereby, when the fluid pumping chamber is in communication with the fluid inlet, the moveable wall is displaced in one direction to fill the pumping chamber with fluid, and whereby, when the fluid pumping chamber is in communication with the fluid outlet, the moveable wall is displaced in the opposite direction to empty fluid from the pumping chamber.

In one embodiment, the reciprocative moving means comprises biasing means for moving the moveable wall in the one direction, and means for selectively controlling communication of the fluid pumping chamber with the fluid outlet and with the fluid inlet. The fluid pumping device also includes means responsive to movement of the moveable wall for pumping a second fluid.

In one embodiment, the fluid pumping arrangement further includes means for continuing the supply of fluid to the suction port when the fluid outlet is not in communication with the fluid pumping chamber.

This invention also provides a fluid pumping device comprising a pump housing defining a recess including therein a moveable wall which cooperates with the recess to define a variable volume fluid metering chamber. The device also includes biasing means for moving the moveable wall in one direction, a fluid outlet communicable with the fluid metering chamber and adapted to communicate with a suction port of a fluid pump so that suction present at the suction port communicates with the fluid metering chamber and moves the moveable wall in the opposite direction against the action of the biasing means when the fluid chamber is in communication with the fluid outlet. The device also includes a fluid inlet communicable with the fluid metering chamber and adapted to communicate with a source of fluid, and means for selectively controlling communication of the fluid chamber with the fluid inlet and the fluid outlet.

The fluid pumping device also includes a bore which is in the pump housing and which extends perpendicularly from the moveable wall and which partially defines a variable volume fluid pumping chamber, and a piston which is received in the bore and which includes a first end and a second end. The first end is attached to the moveable wall and the second end cooperates with the bore to form the variable volume fluid pumping chamber. The device also includes a second fluid inlet in communication with the fluid pumping chamber and adapted to communicate with a second source of fluid, and check valve means in the second fluid inlet for permitting fluid flow into and preventing fluid flow from the fluid pumping chamber. The device also includes a second fluid outlet in communication with the fluid pumping chamber and adapted to communicate with the suction port, and check valve means in the second fluid outlet for permitting fluid flow from and preventing fluid flow into the fluid pumping chamber.

In one embodiment, the fluid pumping device is included in a marine propulsion device, and the source of fluid is a source of fuel, and the second source of fluid is a source of oil.

One of the principal features of this invention is the provision of a fluid pumping device, for a fluid such as oil, which can be located adjacent an oil source so that the length of the oil line between the device and the source of oil is small and little or no priming of the oil line is required.

Another of the principal features of this invention is the provision of such a device which can pump oil and apportion fuel and oil for a two cycle internal combustion engine when used in an application such as a marine propulsion device.

Other features and advantages of embodiments of the invention will become apparent upon reviewing the following drawings, the detailed description and the appended claims.

BRIEF DESCRIPTION OF THE DRAWINGS

FIG. 1 is a side view of a marine propulsion device mounted on a marine vehicle. The propulsion device includes a fluid pumping arrangement (illustrated schematically) which embodies various of the features of the invention.

FIG. 2 is a cross-sectional view of a fluid pumping device which embodies various of the features of the invention.

FIG. 3 is a cross-sectional view of another embodiment of a portion of the fluid pumping device shown in FIG. 2.

Figure 4:
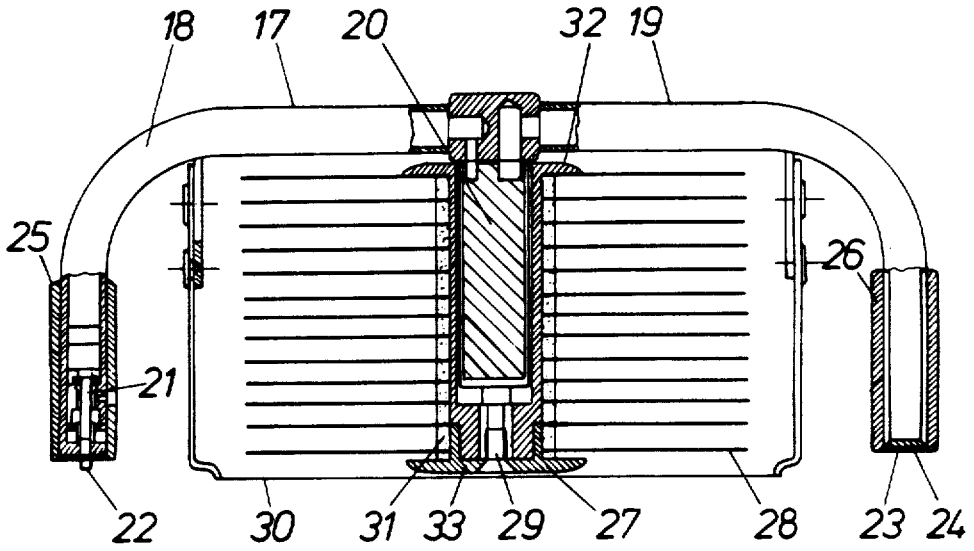
Figure 5:
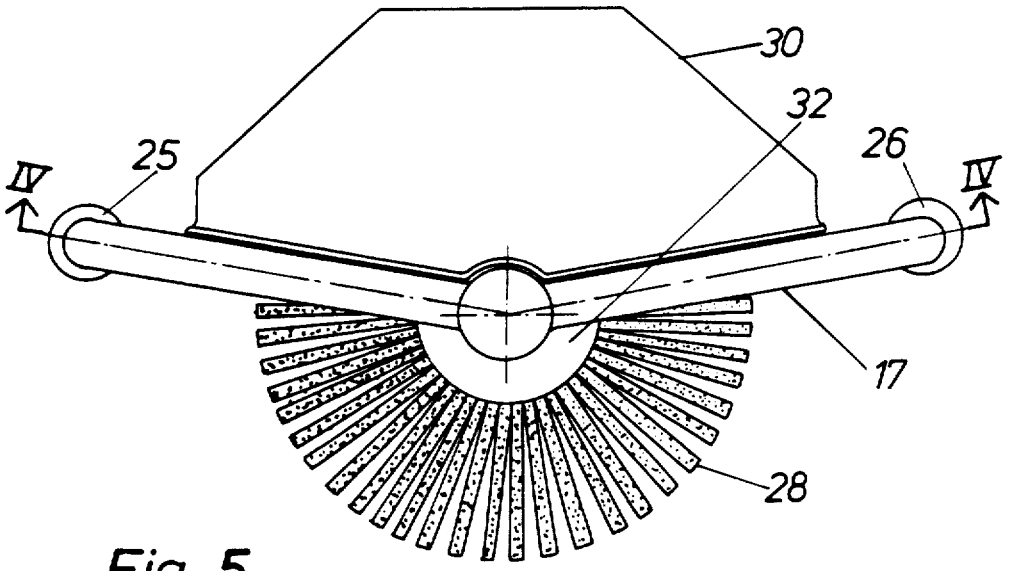

Before explaining at least one embodiment of the invention in detail, it is to be understood that the invention is not limited in its application to the details of construction and the arrangement of the components set forth in the following description or illustrated in the drawings. The invention is capable of other embodiments and of being practiced or carried out in various way. Also, it is to be understood that the phraseology and terminology employed herein is for the purposes of description and should not be regarded as limiting.

DESCRIPTION OF PREFERRED EMBODIMENTS

As illustrated in the drawings, this invention provides a fluid pumping arrangement including a fluid pumping device 10 for pumping fluids such as fuel and oil, and a fluid or fuel pump 52. More particularly, as illustrated in FIG. 1, the device 10 and fuel pump 52 are included in a marine propulsion device 14 mounted on a marine vehicle 18, but the device and fluid pump can also be used in other applications where fluid pumping is desired.

The marine propulsion device 14 includes a lower unit 22 rotatably supporting a propeller 26 and a drive train 30 for rotating th propeller 26. The propulsion device 14 also includes an upper unit 34 which is attached to the lower unit 22 and which includes a two-stroke engine 42 for driving the drive train 30. The two-stroke internal combustion engine 42 comprises an engine block 46, and a crankcase 50, and the fuel pump 52, and a carburetor 54 attached by suitable means to the crankcase 50. The device 10 supplies fuel and oil to the fuel pump 52 through conduit 64 and is mounted adjacent a source of fuel and a source of oil located within the marine vehicle 18. The device 10 is connected to fuel and oil conduits 66 and 70, respectively, as described in more detail below.

As illustrated in FIG. 2, the fluid pumping device 10 comprises a metering portion 71 for metering a fluid such as fuel and a pumping portion 72 for pumping a fluid such as oil. The fuel metering portion 71 communicates with the source of fuel and a suction port 73 to the fuel pump 52. The fuel metering portion 71 is driven by the suction present at the suction port 73, and drives the oil pumping portion 72 while metering fuel, as more fully described hereinafter.

The fuel metering portion 71 includes a pump housing 74 which defines a recess 78. The device 10 also includes a moveable wall 82 which is located in the recess 78 and which cooperates with the recess 78 to define a variable volume fuel metering or fuel pumping chamber 86, and an air chamber 90. A vent 92 communicates the air chamber 90 with ambient air.

The moveable wall 82 comprises a flexible membrane 94 peripherally connected to the pump housing 74 and a pair of plates secured on opposite sides of the flexible membrane 94 to form a piston portion 98 centrally located in the moveable wall 82.

The fuel metering portion 71 communicates with the suction port 73 to the fuel pump 52 so suction present at the suction port 73 can move the moveable wall 82 and meter or pump fuel from the fuel source. More particularly, the fuel metering portion 71 comprises a fuel outlet 122 in the housing 74 and in communication with the suction port 73 by the conduit 64 so suction present at the suction port 73 moves the moveable wall 82 in one direction when the fuel outlet 22 is in communication with the fuel chamber 86, as described in more detail below. The metering portion 71 also includes a fuel inlet 126 in the housing 74 and in communication with the fuel source by conduit 66, means 130 for selectively controlling communication of the fuel chamber 86 with the fuel outlet 122 and the fuel inlet 126, and means for moving the moveable wall 82 in the opposite direction when the fuel chamber 86 is in communication with the fuel inlet 126.

When the suction port 73 is in communication with the fuel chamber 86, suction causes pressure differential across the moveable wall 82 which in turn causes the volume of fuel chamber 86 to reduce, thereby resulting in the removal of fuel from the fuel metering chamber 86.

After the fuel chamber 86 discharges fuel and the moveable wall 82 is fully displaced in one direction, the fuel inlet 126 provides means for allowing fuel at atmospheric pressure to enter the fuel chamber 86 to eliminate the driving pressure differential across the moveable wall 82, thereby permitting reverse movement of the moveable wall 82.

Means is provided to prohibit the withdrawal of fuel from the fuel chamber 86, and to permit fuel to flow into the fuel chamber 86 from the fuel source. Such means is a one-way valve 142 included in the fuel inlet 126.

The means provided for moving the moveable wall 82 in the opposite direction when the fuel chamber 86 is in communication with the fuel inlet 126 is in the form of a spring 154 which is in the fuel chamber 90 between the portion of the pump housing 74 forming part of the fuel chamber 86, and the piston portion 98 of the moveable wall 82. The spring 154 is operative to move the moveable wall 82 in the opposite direction, thereby increasing the volume of the fuel chamber 86 and pulling fuel into the fuel metering chamber 86 through conduit 66 from the fuel source.

As illustrated in FIG. 2, the selective controlling means 130 comprises a valve housing 170 which, in the embodiment shown, is integral with the pump housing 74, and which defines a valve chamber 174, a first suction passageway 178 which extends between the fuel outlet 122 and the valve chamber 174, and a first fuel passageway 182 which extends from the valve chamber 174 to the fuel inlet 126. The selective controlling means 130 also includes a second suction passageway 190 which extends from the valve chamber 174 to and communicates through an inlet port 191 with the fuel chamber 86, a second fuel passageway 194 which extends through an outlet port 195 from the fuel chamber 86 to the valve chamber 174, and a shuttle valve 198 which is received in the valve chamber 174.

The valve chamber 174 includes a first end 202 and a second end 204, and the first and second suction passageways 178 and 190, respectively, are in communication with the first end 202 of the valve chamber 174, and the first and second fuel passageways 182 and 194, respectively, are in communication with the second end 204 of the valve chamber 174.

The shuttle valve 198 is moveable between a first position, wherein the fuel outlet 122 is in communication with the fuel chamber 86, and a second position, wherein the fuel inlet 126 is in communication with the fuel chamber 86. In the first position, the first end 202 of the valve chamber is open and the second end 204 of the valve chamber is sealed by the shuttle valve 198. As a result, in the first position, the first suction passageway 178 is in communication with the second suction passageway 190, and the first fuel passageway 182 is not in communication with the second fuel passageway 194.

In the second position, the second end 204 of the valve chamber 174 is open and the first end 202 of the valve chamber 174 is sealed by the shuttle valve 198. As a result, in this second position, the first fuel passageway 182 is in communication with the second fuel passageway 194, and the first suction passageway 178 is not in communication with the second suction passageway 194.

The selective controlling means 130 also includes means for connecting the shuttle valve 198 to the moveable wall 82 and for permitting lost motion between the shuttle valve 198 and the moveable wall 82. This lost motion means insures the shuttle valve 198 does not move from the first position to the second position until the moveable wall 82 is fully displaced in one direction. Likewise, the lost motion means insures the shuttle valve 198 moves back in the other direction, from the second position to the first position, only when the moveable wall 82 is fully displaced in the opposite direction.

The connecting and lost motion means comprises a rod 210 with an end which is attached, by suitable means, to the piston portion 98 of the moveable wall 82. The rod 210 extends through a bore 212 in the housing 74 to the shuttle valve 198, and a seal 213 is provided to prevent the passage of fluid around the rod 210 through the bore 212.

The other end 214 of the rod 210 is slidably received and secured in a recess 218 in the shuttle valve 198. More particularly, the rod 210 extends through an opening 222 into the recess 218 in the shuttle valve 198, and the end 214 of the rod 210 is received in the recess 218 and is larger than the opening 222 through which the rod 210 extends. The end 214 of the rod 210 is also spaced apart from the ends of the recess 218 so lost motion is provided between the shuttle valve 198 and the rod 210.

In order to prevent the shuttle valve 198 from being located centrally between the first and second positions, the selective controlling means 130 also includes detent means 226 for alternately biasing the shuttle valve 198 towards the first position and the second position.

As illustrated in FIG. 2, one embodiment of such detent means 226 comprises a raised portion 238 incorporated into the side of the shuttle valve 198 between the ends thereof, and a rounded member 242 adjacent the raised portion 238 and received in a bore 246 in the side of the valve housing 170.

The raised portion 238 of the shuttle valve 198 includes two inclined surfaces 250 and 252, which come together to form a peak on the side of the shuttle valve 198. Means in the form of a spring 254 located in the bore 246 is provided for biasing the rounded member 242 towards the raised portion 238 of the shuttle valve 198, so that the rounded member 242 acts on the inclined surfaces 250 and 252 of the raised portion 238, urging the shuttle valve 198 in either one direction or the other, depending on which side of the raised portion 238 the rounded member 242 is on. In this manner, the shuttle valve 198 is urged to remain in either the first or second position until moved by the rod 210 attached to the moveable wall 82.

As illustrated in FIG. 3, another embodiment of the detent means 226 comprises springs 230 and 234 in the shuttle valve 198. The end 214 is again spaced from the ends of the recess 218, and one spring 230 extends between the end 214 of the rod 210 and one end of the shuttle valve 198, while the other spring 234 is concentric with the rod 210 and disposed between the end 214 of the rod 210 and the other end of the shuttle valve 198.

When the shuttle valve 198 is in either the first or second position, one of the springs 230 and 234 is compressed, while the other spring is relaxed. As the end 214 of the rod 210 starts to move from one end of the recess 218 to the other, the compressed spring begins to relax and the other spring eventually begins to compress forcing the shuttle valve 198 to the other position. Some movement of the end 214 of the rod 210 is required before the compressed spring becomes fully relaxed, so the shuttle valve 198 is urged to remain in its current position by the still compressed spring despite the initial movement of the end 214 of the rod 210.

The spring 154 also assists in biasing the shuttle valve 198 toward the first position.

As illustrated in FIG. 2, the oil pumping portion 72 includes the housing 74 and means for pumping oil in response to movement of the moveable wall 82. The oil pumping means comprises a variable volume oil pumping chamber 262 formed by a closed bore 266 extending from the fuel chamber 86 and perpendicularly from the moveable wall 82, and by the end 270 of a piston 274 received in the bore 266. The other end of the piston 274 is attached by suitable means to the piston portion 98 of the moveable wall 82. The volume of the oil pumping chamber 262 therefore varies with the movement of the moveable wall 82.

In this embodiment, in order to provide for the desired oil to fuel ratio, the oil pumping chamber 262 is approximately one-fiftieth the size of the fuel chamber 86. A seal 278 is also provided around the plunger 274 to prevent the oil chamber 262 from communicating with the fuel chamber 86.

The oil pumping means also includes an inlet 280 including a one-way valve for introducing oil into the oil chamber 262 and for preventing oil from exiting the oil chamber 262, and an outlet 284 including a one-way valve 286 for permitting oil flow from the oil chamber 262 and for preventing oil flow into the oil chamber 262.

The oil chamber inlet 280 is connected by conduit 70 to the source of oil, and the outlet 284 from the oil pumping chamber 262 is in communication through a line 288 in the fuel line 64 to the fuel pump 52. The one-way valve 286 is spring biased so as to prevent suction present at a suction port 73 from removing oil from the oil pumping chamber 262. Although, in this embodiment, the line 288 is connected to the portion of the housing 74 forming the fluid outlet 122, the line 288 can be connected to the conduit 64 or the suction port 73 in other embodiments.

The device 10 further includes supply continuation and manual priming means 290 in communication with the conduit 64 for priming the fuel pump 52 and for continuing to supply fuel and oil to the fuel pump 52 while the device 10 is taking in fuel and oil from the respective sources. More particularly, the manual priming and supply continuation means 290 comprises a housing 292 defining a recess 294, which recess 294 includes therein a moveable wall 296. Although forming a separate housing 292 in this embodiment, the housing 292 can be integral with housing 74 in other embodiments. The moveable wall 296 cooperates with the recess 294 to define a variable volume supply chamber 298 and an air chamber 300. The air chamber 300 communicates with ambient air through a vent 302. The moveable wall 296 comprises a flexible membrane 304 peripherally connected to the housing 292, and a piston portion 306 centrally located in the moveable wall 296.

A member 308 is connected to the piston portion 306 and extends through the air chamber 300 and outside of the housing 292 through an opening 310 therein. The member 308 is adapted to be moved by an operator for purposes of moving the moveable wall 296 in one direction to expel fluid from the supply chamber 298 when the means 290 is used for manual priming.

Means is also provided for moving the moveable wall 296 in the opposite direction after the moveable wall 296 moves in one direction. Such means is in the form of a spring 312 received in the supply chamber 298 and disposed between the piston portion 306 and the portion of the housing 292 defining the supply chamber 298. The supply chamber 298 is in communication with a fluid port 316 communicating with the conduit 64 to the fuel pump 52 by means of a priming line 314. In other embodiments, the line 314 can be connected to the suction port 73 or the fluid outlet 122.

Means in the form of a one-way check valve 317 is included in the fuel outlet 122 to permit fluid flow from the fuel outlet 122 and to prevent fluid flow to the fuel outlet 122 when priming the fuel pump 52 is desired.

More particularly, when the volume of supply chamber 298 increases when the action of the spring 312, fuel and oil are pulled into the supply chamber 298 through the check valve 317 from the fuel chamber 86. When manual priming is desired, the volume of the supply chamber 298 is decreased by moving the member 308. The fuel and oil flowing from the supply chamber 298 flows to the fuel pump 52 and not through the check valve 316.

When the fluid pumping device 10 and fuel pump 52 are operating to supply a flow of fuel and oil to the engine 42, the supply continuation means 290 continues supply to the fuel pump 52, when fuel and oil are not flowing from the device 10. More particularly, when the fluid outlet is not in communication with the fuel chamber 86 because the shuttle valve 198 is in the second position, suction present at the suction port 73 moves the moveable wall 304 in one direction, emptying the supply chamber 298 and supplying fuel and oil to the suction port 73. Then, when the shuttle valve 198 is in the first position and the fluid outlet 122 is in communication with the fuel chamber 86, the spring 312 biases the moveable wall 304 in the opposite direction to fill the supply chamber 298 with fluid while also supplying fuel and oil to the suction port 73.

Various of the features of the invention are set forth in the following claims.

I claim:

1. A fluid pumping arrangement including a fluid pump including a suction port, and a fluid pumping device comprising a pump housing defining a recess, a moveable wall which is located in said recess and which cooperates with said recess to define a variable volume pumping chamber, biasing means for moving said moveable wall in one direction, a fluid outlet communicable with said fluid pumping chamber and communicating with said suction port so that suction present at said suction port communicates with said fluid pumping chamber and thereby moves said moveable wall in the opposite direction against the action of said biasing means when said fluid pumping chamber is in communication with said fluid outlet, a fluid inlet communicable with said fluid pumping chamber and adapted to communicate with a source of fluid, means for selectively controlling communication of said fluid pumping chamber with said fluid outlet and with said fluid inlet, and means responsive to movement of said moveable wall for pumping a second fluid and comprising a bore which is in said pump housing and which extends perpendicularly from said moveable wall and which partially defines a second variable volume fluid pumping chamber, a piston which is received in said bore and which includes a first end and a second end, said first end being attached to said moveable wall and said second end cooperating with said bore to form said second variable volume fluid pumping chamber, a second fluid inlet in communication with said second fluid pumping chamber and adapted to communicate with said second fluid pumping chamber and adapted to communicate with a second source of fluid, check valve means in said second fluid inlet for permitting fluid flow into and preventing fluid flow from said second fluid pumping chamber, a second fluid outlet in communication with said second fluid pumping chamber and adapted to communicate with said suction port, and check valve means in said second fluid outlet for permitting fluid flow from and preventing fluid flow into said second fluid pumping chamber.

2. A marine propulsion device including a fluid pump including a suction port, and a fluid pumping device comprising a pump housing defining a recess, a moveable wall which is located in said recess and which cooperates with said recess to define a variable volume pumping chamber, biasing means for moving said moveable wall in one direction, a fluid outlet communicable with said fluid pumping chamber and communicating with said suction port so that suction present at said suction port communicates with said fluid pumping chamber and thereby moves said moveable wall in the opposite direction against the action of said biasing means when said fluid pumping chamber is in communication with said fluid outlet, a fluid inlet communicable with said fluid pumping chamber and adapted to communicate with a source of fluid, means for selectively controlling communication of said fluid pumping chamber with said fluid inlet, and means for continuing the flow of fluid to said suction port when said fluid outlet is not in communication with said fluid puming chamber, said supply continuation means comprising a housing defining a supply recess, a supply moveable wall which is located in said supply recess and which cooperates with said supply recess to define a variable volume supply chamber, a fluid port communicating with said supply chamber, said fluid outlet, and said suction port so that suction present at said suction port moves said supply moveable wall in one direction to thereby supply fluid to said suction port from said supply chamber when said fluid outlet is not in communication with said fluid pumping chamber, and means for biasing said supply moveable wall in the opposite direction to thereby fill said supply chamber with fluid when said fluid outlet is in communication with said fluid pumping chamber.

3. A fluid pumping arrangement including a fluid pump including a suction port, and a fluid pumping device comprising a pump housing defining a recess, a moveable wall which is located in said recess and which cooperates with said recess to define a variable volume pumping chamber, a fluid inlet adapted to communicate with a source of fluid, means [alterately] *alternately* operable for selectively communicating said fluid pumping chamber with said fluid inlet and with said suction port, and means for effecting reciprocating movement of said moveable wall in response to alternate communication of said fluid pumping chamber with said suction port and with said fluid inlet, whereby, when said fluid pumping chamber is in communication with said fluid inlet, said moveable wall is displaced in one direction to fill said pumping chamber with fluid, and whereby, when said fluid pumping chamber is in communication with said suction port, said moveable wall is displaced in the direction opposite to said one direction to empty fluid from said pumping chamber, said means for pumping a second fluid comprising a bore which is in said pump housing and which extends perpendicularly from said movable wall and which partially defines a second variable volume fluid pumping chamber, a piston which is received in said bore and which includes a first end and a second end, said first end being attached to said movable wall and said second end cooperating with said bore to form said second variable volume fluid pumping chamber, a second fluid inlet in communication with said second fluid pumping chamber and adapted to communicate with a second source of fluid, check valve means in said second fluid inlet for permitting fluid flow into and preventing fluid flow from said second fluid pumping chamber, a fluid outlet in communication with said second fluid pumping chamber and adapted to communicate with said suction port, and check valve means in said second fluid outlet for permitting fluid flow from and preventing fluid flow into said second fluid pumping chamber.

4. A fluid pumping arrangement including a fluid pump including a suction port, and a fluid pumping device comprising a pump housing defining a recess, a moveable wall which is located in said recess and which cooperates with said recess to define a variable volume pumping chamber, a fluid inlet adapted to communicate with a source of fluid, means alternately operable for selecting communicating said pumping chamber with said fluid inlet and with said fluid port, means for effecting reciprocating movement of said moveable wall in response to alternate communication of said fluid pumping chamber with said suction port and with said fluid inlet, whereby, when said fluid pumping chamber is in communication with said fluid inlet, said moveable wall is displaced in one direction to fill said pumping chamber with fluid, and whereby, when said fluid pumping chamber is in communication with said suction port, said moveable wall is displaced in the direction opposite to said one direction to empty fluid from said pumping chamber, and means for continuing the supply of fluid to said suction port when said suction port is not in communication with said fluid pumping chamber said supply continuation means comprising a housing defining a supply recess, a supply moveable wall which is located in said supply recess and which cooperates with said supply recess to define a variable volume supply chamber, a fluid port communicating with said supply chamber, and said suction port so that suction present at said suction port moves said supply moveable wall in one direction to thereby supply fluid to said suction port from said supply chamber when said suction port is not in communication with said fluid pumping chamber, and means for biasing said supply moveable wall in the opposite direction to thereby fill said supply chamber with fluid when said suction port is in communication with said fluid pumping chamber.

5. A marine propulsion device including a propeller, a lower unit rotatably supporting said propeller, an upper unit supported by said lower unit and including an engine, and a fuel pump including a suction port, drive train means for rotating said propeller, said drive train means being driven by said engine, and a fluid pumping device comprising a pump housing defining a recess, a moveable wall which is in said recess and which cooperates with said recess to define a variable volume fuel metering chamber, biasing means for moving said moveable wall in one direction, a fuel outlet communicable with said fuel metering chamber and communicating with said suction port, so that suction present at the suction port communicates with said fuel metering chamber and thereby moves said moveable wall in the opposite direction against the action of said biasing means when said fuel metering chamber is in communication with said fuel outlet, a fuel inlet communicable with said fuel metering chamber and adapted to communicate with a source of fuel, means for selectively controlling communication of said fuel metering chamber with said fuel outlet and said fuel inlet, a bore which is in said pump housing and which extends perpendicularly from said moveable wall and which partially defines a variable volume oil pumping chamber, a piston which is received in said bore and which includes a first end and a second end, said first end being attached to said moveable wall and said second end cooperating with said bore to form said variable volume oil pumping chamber, an oil inlet in communication with said oil pumping chamber and adapted to communicate with a source of oil, check valve means in said oil inlet for permitting oil flow into and preventing fluid flow from said oil pumping chamber, an oil outlet in communication with said oil pumping chamber and adapted to communicate with the suction port, and check valve means in said oil outlet for permitting oil flow from and preventing oil flow into said oil pumping chamber.

6. A marine propulsion device including a propeller, a lower unit rotatably supporting said propeller, an upper unit supported by said lower unit and including an engine, and a fuel pump including a suction port, drive train means driven by said engine for rotating said propeller, and a fluid pumping device comprising a pump housing defining a recess, a moveable wall which is located in said recess and which cooperates with said recess to define a variable volume pumping chamber, biasing means for moving said moveable wall in one direction, a fluid inlet adapted to communicate with a source of fluid, valve means for alternately communicating said pumping chamber with said suction port so that said suction port drains fluid from said pumping chamber, thereby displacing said moveable wall in the direction opposite to said one direction, and with said fluid inlet so that fluid at said inlet is supplied to said pumping chamber in response to wall movement in said one direction, and means for operating said valve means in response to movement of said moveable wall.

7. A marine propulsion device including a propeller, a lower unit rotatably supporting said propeller, an upper unit supported by said lower unit and including an engine, and a fuel pump including a suction port, drive train means driven by said engine for rotating said propeller, and a fluid pumping device comprising a pump housing defining a recess, a moveable wall which is located in said recess, which cooperates with said recess to define a variable volume pumping chamber [, and] which includes an inlet port and an outlet port in spaced relation to said inlet port, a fluid inlet adapted to communicate with a source of fluid, means operable for alternately communicating said outlet port with said suction port and communicating said inlet port with said fluid inlet, and means for effecting reciprocating movement of said moveable wall in response to alternate communication of said inlet port with said fluid inlet and communication of said outlet port with said suction port, whereby, when said fluid pumping chamber is in communication with said fluid inlet, said moveable wall is displaced in one direction to fill said pumping chamber with fluid, and whereby, when said fluid pumping chamber is in communication with said suction port, said moveable wall is displaced in the direction opposite to said one direction to empty fluid from said pumping chamber.

8. A fluid pumping arrangement including a fluid pump including a suction port, and a fluid pumping device comprising a pump housing defining a recess, a moveable wall which is located in said recess and which cooperates with said recess to define a variable volume pumping chamber, biasing means for moving said moveable wall in one direction, a fluid inlet adapted to communicate with a source of fluid, valve means for alternately communicating said pumping chamber with said suction port so that said suction port drains fluid from said pumping chamber, thereby displacing said moveable wall in the direction opposite to said one direction, and with said fluid inlet so that fluid at said inlet is supplied to said pumping chamber in response to wall movement in said one direction, and means for operating said valve means in response to movement of said moveable wall.

9. A fluid pumping arrangement in accordance with claim 8 wherein said fluid pumping device further includes means responsive to movement of said moveable wall for pumping a second fluid.

10. A fluid pumping arrangement in accordance with claim 8 wherein said biasing means for moving said moveable wall in one direction comprises a spring in said fluid pumping chamber and extending between said moveable wall and said pump housing.

11. A fluid pumping arrangement in accordance with claim 8 and further including means for continuing the flow or fluid to said suction port when said fluid outlet is not in communication with said fluid pumping chamber.

12. A fluid pumping arrangement including a fluid pump including a suction port, and a fluid pumping device comprising a pump housing defining a recess, a moveable wall which is located in said recess and which cooperates with said recess to define a variable volume pumping chamber, biasing means for moving said moveable wall in one direction, a fluid outlet communicable with said fluid pumping chamber and communicating with said suction port so that suction present at said suction port communicates with said fluid pumping chamber and thereby moves said moveable wall in the opposite direction against the action of said biasing means when said fluid pumping chamber is in communication with said fluid outlet, a fluid inlet communicable with said fluid pumping chamber and adapted to communicate with a source of fluid, and means for selectively controlling communication of said fluid pumping chamber with said fluid outlet and with said fluit inlet, said selective controlling means comprising a valve housing defining a valve chamber, a first suction passageway extending between said fluid outlet and said valve chamber, a first fluid passageway extending from said valve chamber to said fluid inlet, a second suction passageway extending from said valve chamber to said fluid pumping chamber, a second fluid passageway extending from said fluid pumping chamber to said valve chamber, a shuttle valve in said valve chamber and moveable between a first position wherein said first suction passageway is in communication with said second suction passageway and said first fluid passageway is not in communication with said second fluid passageway, and a second position wherein said first fluid passageway is in communication with said second fluid passageway and said first suction passageway is not in communication with said second suction passageway, and means connecting said shuttle valve to said moveable wall and providing for lost motion between said shuttle valve and said moveable wall.

13. A fluid pumping arrangement in accordance with claim 12 wherein said valve chamber includes a first end and a second end, and wherein said first and second suction passageways are in communication with said first end of said valve chamber, and wherein said first and second fluid passageways are in communication with said second end of said valve chamber.

14. A fluid pumping arrangement in accordance with claim 12 wherein said selective controlling means further includes detent means for alternately biasing said shuttle valve towards said first position and said second position.

15. A fluid pumping arrangement including a fluid pump including a suction port, and a fluid pumping device comprising a pump housing defining a recess, a moveable wall which is located in said recess, which cooperates with said recess to define a variable volume pumping chamber [, and] which includes an inlet port and an outlet port in spaced relation to said inlet port, a fluid inlet adapted to communicate with a source of fluid, means operable for alternately communicating said outlet port with said suction port and communicating said inlet port with said fluid inlet, and means for effecting reciprocating movement of said moveable wall in response to alternate communication of said inlet port with said fluid inlet and communication of said outlet port with said suction port, whereby, when said fluid pumping chamber is in communication with said fluid inlet, said moveable wall is displaced in one direction to fill said pumping chamber with fluid, and whereby, when said fluid pumping chamber is in communication with said suction port, said moveable wall is displaced in the direction opposite to said one direction to empty fluid from said pumping chamber.

16. A fluid pumping arrangement in accordance with claim 15 wherein said fluid pumping device further includes means responsive to movement of said moveable wall for operating said selective communication means.

17. A fluid pumping arrangement in accordance with claim 15 wherein said reciprocative moving means comprises biasing means for moving said moveable wall in said one direction.

18. A fluid pumping arrangement in accordance with claim 15 and further including means for continuing the supply of fluid to said suction port when said suction port is not in communication with said fluid pumping chamber.

19. A fluid pumping device comprising a pump housing defining a recess, a moveable wall which is in said recess and which cooperates with said recess to define a variable volume fluid metering chamber, biasing means for moving said moveable wall in one direction, a fluid outlet communicable with said fluid metering chamber and adapted to communicate with a suction port of a fluid pump so that suction present at the suction port communicates with said fluid metering chamber and thereby moves said moveable wall in the opposite direction against the action of said biasing means when said fluid metering chamber is in communication with said fluid outlet, a fluid inlet communicable with said fluid metering chamber and adapted to communicate with a source of fluid, means for selectively controlling communication of said fluid metering chamber with said fluid outlet and said fluid inlet, a bore which is in said pump housing and which extends perpendicularly from said moveable wall and which partially defines a variable volume fluid pumping chamber, a piston which is received in said bore and which includes a first end and a second end, said first end being attached to said moveable wall and said second end cooperating with said bore to form said variable volume fluid pumping chamber, a second fluid inlet in communication with said fluid pumping chamber and adapted to communicate with a second source of fluid, check valve means in said second fluid inlet for permitting fluid flow into and preventing fluid flow from said fluid pumping chamber, a second fluid outlet in communication with said fluid pumping chamber and adapted to communicate with the suction port, and check valve means in said second fluid outlet for permitting fluid flow from and preventing fluid flow into said fluid pumping chamber.

20. A fluid pumping device in accordance with claim 19 wherein said selective controlling means comprises a valve housing defining a valve chamber, a first suction passageway extending between said fluid outlet and said valve chamber, a first fluid passageway extending from said valve chamber to said fluid inlet, a second suction passageway extending from said valve chamber to said fluid metering chamber, a second fluid passageway extending from said fluid metering chamber to said valve chamber, a shuttle valve in said valve chamber and moveable between a first position wherein said first suction passageway is in communication with said second suction passageway and said first fluid passageway is not in communication with said second fluid passageway, and a second position wherein said first fluid passageway is in communication with said second fluid passageway and said first suction passageway is not in communication with said second suction passageway, and means connecting said shuttle valve to said moveable wall and providing for lost motion between said shuttle valve and said moveable wall.

21. A fluid pumping device in accordance with claim 20 wherein said valve chamber includes a first end and a second end, and wherein said first and second suction passageways are in communication with said first end of said valve chamber, and wherein said first and second passageways are in communication with said second end of said valve chamber.

22. A fluid pumping device in accordance with claim 20 wherein said selective controlling means further includes detent means for alternately biasing said shuttle valve towards said first position and said second position.

23. A fluid pumping device in accordance with claim 20 wherein said biasing means for moving said moveable wall comprises a spring in said fluid metering chamber and extending between said moveable wall and said pump housing.

24. A fluid pumping device in accordance with claim 20 and further including means for continuing the supply of fluid to the suction port when said fluid outlet is not in communication with said fluid metering chamber.

25. A fluid proportioning device in accordance with claim 24 wherein said supply continuation means comprises a housing defining a supply recess, a supply moveable wall which is located in said supply recess and which cooperates with said supply recess to define a variable volume supply chamber, a fluid port communicating with said supply chamber, said fluid outlet, and the suction port so that suction present at the suction port moves said supply moveable wall in one direction so that said supply chamber supplies fluid to the suction port when said fluid outlet is not in communication with said fluid metering chamber, and means for biasing said supply moveable wall in the opposite direction to fill said supply chamber with fluid when said fluid outlet is in communication with said fluid metering chamber.

*26. Apparatus for pumping oil and for delivering fuel to a fuel pump for a two-stroke internal combustion engine, the fuel pump including a suction port, said apparatus comprising a first inlet adapted to communicate with a source of oil, a second inlet adapted to communicate with a source of fuel, an outlet adapted to communicate with the suction port, and means operative in response to suction at said outlet for delivering fuel from said outlet, and for pumping oil.*

*27. An assembly for separately storing oil, for pumping oil, and for delivering fuel to a fuel pump for a two-stroke internal combustion engine, the fuel pump including a suction port, said assembly comprising an oil reservoir, and an apparatus located adjacent said oil reservoir and including a first inlet communicating with said oil reservoir, a second inlet adapted to communicate with a source of fuel, an outlet adapted to communicate with the suction port, and means operative in response to suction at said outlet for delivering fuel from said outlet, and for pumping oil.*

*28. An assembly for separately storing oil and fuel for pumping oil, and for delivering fuel to a fuel pump for a two-stroke internal combustion engine, the fuel pump including a suction port, said assembly comprising a fuel reservoir, an oil reservoir, and an apparatus including a first inlet communicating with said fuel reservoir, a second inlet communicating with said oil reservoir, an outler adapted to communicate with the suction port, and means operative in response to suction at said outlet for delivering fuel from said outlet, and for pumping oil.*

*29. A marine installation comprising a marine propulsion device including a rotatably mounted propeller, an engine drivingly connected to said propeller, and a fuel pump for supplying fuel to said engine, said fuel pump including a suction port, and an assembly for separately storing oil, for pumping oil, and for delivering fuel to said fuel pump, said assembly including an oil reservoir, and an apparatus located adjacent said oil reservoir and including a first inlet communicating with said oil reservoir, a second inlet adapted to communicate with a source of fuel, an outlet communicating with said suction port, and means operative in response to suction at said outlet for delivering fuel to said fuel pump via said outlet, and for pumping oil.*

*30. A marine installation comprising a marine propulsion device including a rotatably mounted propeller, an*

*engine drivingly connected to said propeller, and a fuel pump for supplying fuel to said engine, said fuel pump including a suction port, and apparatus for pumping oil, and for delivering fuel to said fuel pump, said apparatus including a first inlet adapted to communicate with a source of oil, a second inlet adapted to communicate with a source of fuel, an outlet communicating with said suction port, and means operative in response to suction at said outlet for delivering fuel to said fuel pump via said outlet, and for pumping oil.*

*31. A marine installation comprising a marine propulsion device including a rotatably mounted propeller, an engine drivingly connected to said propeller, and a fuel pump for supplying fuel to said engine, said fuel pump including a suction port, and an assembly for separately storing oil and fuel, for pumping oil, and for delivering fuel to said fuel pump, said assembly including a fuel reservoir, an oil reservoir, and an apparatus including a first inlet communicating with said oil reservoir, a second inlet communicating with said fuel reservoir, an outlet communicating with said suction port, and means operative in response to suction at said outlet for delivering fuel to said fuel pump via said outlet, and for pumping oil.*

*32. A marine installation as set forth in claim 31 wherein said oil reservoir and said fuel reservoir are located remotely from said marine propulsion device.*

* * * * *